(12) United States Patent
Czapp et al.

(10) Patent No.: US 12,075,942 B2
(45) Date of Patent: Sep. 3, 2024

(54) DEVICE FOR STORING FOOD PRODUCTS AT HOT TEMPERATURE

(71) Applicant: Franke Technology and Trademark Ltd, Hergiswil (CH)

(72) Inventors: Ireneusz Czapp, Reda (PL); Andrzej Tusk, Rotmanka (PL); Marek Ormanin, Suchy Dwor (PL); Aleksander Majorek, Reda (PL); Kamil Rachuba, Gdansk (PL)

(73) Assignee: Franke Technology and Trademark Ltd, Hergiswil (CH)

( * ) Notice: Subject to any disclaimer, the term of this patent is extended or adjusted under 35 U.S.C. 154(b) by 705 days.

(21) Appl. No.: 16/835,576

(22) Filed: Mar. 31, 2020

(65) Prior Publication Data

US 2020/0329906 A1  Oct. 22, 2020

(30) Foreign Application Priority Data

Apr. 18, 2019 (EP) .................................... 19170140

(51) Int. Cl.
*A47J 36/24* (2006.01)
*A47J 36/32* (2006.01)
*B65D 81/18* (2006.01)
*B65D 81/26* (2006.01)
*F24C 7/04* (2021.01)
(Continued)

(52) U.S. Cl.
CPC ........... *A47J 36/2483* (2013.01); *A47J 36/32* (2013.01); *B65D 81/18* (2013.01); *B65D 81/26* (2013.01); *F24C 7/046* (2013.01); *F24C 7/087* (2013.01); *F24C 15/325* (2013.01)

(58) Field of Classification Search
CPC .... A47J 39/003; A47J 39/006; A47J 41/0038; A47J 39/02; A47J 36/2483; A47J 36/32; B65D 81/18; B65D 81/26; F24C 7/046; F24C 7/087; F24C 15/325
See application file for complete search history.

(56) References Cited

U.S. PATENT DOCUMENTS

| 4,386,558 A | * | 6/1983 | Holman | ............... A47J 37/0629 |
| | | | | 219/400 |
| 4,499,818 A | * | 2/1985 | Strong | ................. A47J 36/2483 |
| | | | | 219/400 |

(Continued)

OTHER PUBLICATIONS cetal.com (Year: 2019).*

*Primary Examiner* — Nathaniel E Wiehe
*Assistant Examiner* — Fahmida Ferdousi
(74) *Attorney, Agent, or Firm* — Volpe Koenig

(57) ABSTRACT

A device for storing food products at hot temperature, having an outer housing, an inner housing at least partially contained inside the outer housing, and a fan chamber defined within the inner housing, the fan chamber having at least one air inlet and outlet. A fan and a heating element are located inside the fan chamber. A food tray defines a space for holding the food products therein. A first air flow path for guiding a first air flow is defined from outside of the outer housing to the air inlet of the fan chamber, the first flow path extending between the outer housing and the inner housing, and a second air flow path for guiding a second air flow is defined from the air outlet of the fan chamber to the space inside the food tray, and the heating element is located in the second air flow path.

27 Claims, 3 Drawing Sheets

(51) Int. Cl.
  *F24C 7/08* (2006.01)
  *F24C 15/32* (2006.01)

(56) References Cited

U.S. PATENT DOCUMENTS 5,276,309 A * 1/1994 Hasse ................ A47J 36/2483
   219/400
2014/0116268 A1 * 5/2014 Bigott .................... A47J 39/003
   99/483

* cited by examiner

DEVICE FOR STORING FOOD PRODUCTS AT HOT TEMPERATURE

INCORPORATION BY REFERENCE

The following documents are incorporated herein by reference as if fully set forth: European Patent Application No. EP 19 170 140.8, filed Apr. 18, 2019.

TECHNICAL FIELD

The invention relates to a device for storing food products at hot temperature, which device comprises, inter alia, a fan and at least one heating element installed in a vicinity of said fan, wherein the fan is used for conveying hot air provided by the heating element to at least one food tray defining a space for holding said food products.

BACKGROUND

Such devices are known in the art, e.g., for storing french fries or the like in (fast food) restaurants. Known devices use an electric heater in order to generate heat, which heat is then supplied to the food.

The known devices suffer from relatively high energy consumption by the heater, from the fact that a housing of the device may become rather hot, which may be dangerous for a user, and from the fact that certain food stuffs may degenerate due to excessive moisture or humidity.

Furthermore, known devices may recirculate air to conserve energy. This results in food particles to being sucked into the fan, thus creating a reliability hazard (some-times causing a fire risk for the heating element).

SUMMARY

It is the object of the present invention to provide such a device which overcomes the above disadvantages and which shows reduced energy consumption, in-creased user safety and enhanced quality of food storage.

This object is achieved by a device with one or more features of the invention. Advantageous further embodiments are defined below and in the claims.

According to the invention, a device for storing food products at hot temperature comprises: an outer housing; an inner housing, which inner housing is at least partially contained inside said outer housing; a fan chamber defined within said inner housing, said fan chamber having at least one air inlet and one air outlet; a fan lo-cated inside said fan chamber; at least one heating element installed in a vicinity of said fan chamber; and at least one food tray defining a space for holding said food products inside said food tray; wherein a first air flow path for guiding a first air flow is defined from the outside of said outer housing to the air inlet of said fan chamber, said first flow path extending between said outer housing and said inner housing; and a second air flow path for guiding a second air flow is defined from the air outlet of said fan chamber to said space inside said at least one food tray; and the at least one heating element is located in said second air flow path. The housings and the food tray are preferably made of stainless steel or a comparable material.

While hot temperature of the food or food product is maintained by blowing hot air heated by the heating element into said space (which is intended to hold the food product), at the same time moisture from the food product can be convected or drained to the outside, which is highly appreciable for some food products, such as but not limited to fries. The above-described first and second air flows, the second one of which has been heated by the heating element, can be used to pre-heat (cool) ambient air that is provided to the fan, thus enabling the use of heating elements with lower energy consumption. Furthermore, provision of said first and second air flows can have a cooling effect on the outer housing, thus increasing user safety.

In an embodiment of the device according to the invention, the food tray has a length and a width, which length and width define an essentially rectangular opening for accessing said space. This enables easy access to said space for taking out food, e.g., for scooping of fries.

In an embodiment of the device according to the invention, said heating element has a length which essentially corresponds to the length of the food tray, said seating element being arranged parallel to a length direction of said food tray. This enables homogenous heating of the entire food storage space.

In an embodiment of the device according to the invention, the fan and/or the fan chamber is adapted for convey a major part of an air flow generated by the fan to-ward the heating element. In this way, any energy used for driving the fan and/or the heating element is efficiently used.

In an embodiment of the device according to the invention, the fan chamber com-prises at least one deflecting element for conveying at least part an air flow generated by the fan toward the heating element. This may further increase efficiency, as stated above.

In yet another embodiment, the fan chamber has a top guard (i.e. a roof over the heater and fan chamber), which prevents food debris from falling onto the heating element.

In an embodiment of the device according to the invention, said fan is a centrifugal fan. Applicant has found the use of this type of fan leads to best results in terms of energy consumption and reliability as well as required construction space. This type of fan can achieve good pressure vs volume characteristics. Having higher pressure vs volume ratio allows to equalize air flow from the fan chamber. Also, this type of fan provides low but stable (not easily damped) air flow making it more reliable during product assembly and when the unit is dirty. In most other applications on the market, tangential or axial blowers are used, that have much higher air flow volume at lower pressure.

In an embodiment of the device according to the invention, said fan chamber is essentially rectangular in shape with corresponding side walls; and the deflecting element has a shape and is located relative to said fan so as to deflect the air flow generated by the fan toward said air outlet opening of the fan chamber, which air outlet is located in a side wall of said fan chamber. In this way, the fan chamber can be made to correspond in shape to the food tray, thus enabling homogenous heating of the (food storage) space.

In an embodiment of the device according to the invention, the air outlet is located at a longer side wall of said fan chamber, and is preferably devised in the form of a plurality of air outlet openings or slits extending over a major part of said longer side wall. This may further increase homogeneity of the heating effect.

In a preferred embodiment of the device according to the invention, the food tray has series of openings along its upper edge for letting pass an air flow into said space, a first series of said openings being arranged below a second series of said openings, wherein preferably said openings in said first series of openings have a bigger dimension or opening surface than said openings in said second series of openings, said openings most preferably extending over an entire length of said food tray. Said openings may overlap between the two series, meaning that an opening from said first series is located where there is a gap between two adjacent openings from said second series, and vice versa. With this particular design, applicant has achieved efficient separation of (cold) ambient air above the food tray and (hot) air inside the food tray. In fact, the ambient air effectively stays on top of the hot air inside the food tray without mixing. In the center of the device, hot air rises, thus lifting the cold air layer above the food tray.

In an embodiment of the device according to the invention, the fan is located essentially in a center of said fan chamber. This feature may be particularly advantageous when air to be heated is to be conveyed to more than one side of the device, e.g., to opposite side walls.

In an embodiment of the device according to the invention, there are two, preferably identical deflecting elements, each one of said deflecting elements having an apex situated in proximity to said fan and at least two deflectors extending from said apex toward a respective shorter side wall of said fan chamber in a direction toward opposite longer side walls of said fan chamber, said two deflectors preferably forming two sides of a triangular shape. This construction can be used to convey air to be heated in symmetrical fashion to both sides of the device for to achieve a particularly homogeneous heating effect.

In an embodiment of the device according to the invention, the outer housing and the inner housing have essentially parallel side walls and essentially parallel bottom walls; and the air inlet of said fan chamber is located at the bottom wall of the fan chamber and below an entry point for ambient air into the outer housing. With this construction, cool air can be guided along a big part of the outer housing by said first air flow channel, thus optimizing said cooling effect and enabling the use of less powerful heating elements.

In an embodiment of the device according to the invention, an entry point for air into said food tray is located above the air outlet of said fan chamber. This can further increase an area of thermal interaction between said first and second air flows which can have positive impact on said cooling effect and on power consumption by the heating element.

In an embodiment of the device according to the invention, said first air flow path and said second air flow path are substantially parallel, whereas respective first and second air flow directions are substantially antiparallel. This may further enhance the positive impact mentioned above.

In an embodiment of the device according to the invention, the fan chamber is located below said food tray. This has proved to be practical both in terms of required construction space and air flow configuration. Furthermore, serviceability is increased since there can be access from the top to all serviceable components.

In an embodiment of the device according to the invention, the food tray comprises a substantially leak-proof outer tray and an inner tray, said inner tray being suspended or suspendable within said outer tray and having a number of openings at least in its bottom wall. The outer tray can be used as a crumb tray for retaining food crumbs, while the inner tray can be used as a salting tray, i.e. for salting foodstuff contained therein. Food can be placed in the inner tray and heated by air flow through said openings.

For to enhance this latter effect, in an embodiment of the device according to the invention, a third air flow path for guiding a third air flow is defined between a side wall and/or a bottom wall of said inner tray and a side wall and/or a bottom wall of said outer tray, which third air flow is a continuation in part of said second air flow, wherein preferably said third air flow is partly anti-parallel to said second air flow.

This second airflow, when entering the salting tray (outer tray), can take on a horizontal direction, and air speed can be between 0.5 m/s and 2 m/s (for an embodiment of the invention, a corresponding air stream volume can be 60-120 m3/h.

In an embodiment of the device according to the invention, said second air flow path opens to the environment of the device. In this way, part of said third air flow can be used to heat the food from above and/or to efficiently evacuate moisture, as already stated above. This also circumvents the risk of fire for the heating element, since there is no recirculation.

In an embodiment of the device according to the invention, the outer tray com-prises, at its bottom wall a deflecting element for forcing said third air flow upwards through said openings. This further enhances the food heating effect.

During simulation of air flow in the device according to an embodiment of the invention, applicant has reached additional conclusions about said air flow to said food holding space: 1) a top air stream to the food holding space should go as parallel as possible to a bottom surface of said salting tray. 2) An air stream from the bottom wall of the salting tray upwards should be sufficient (high enough to pre-vent said top air stream from sucking in ambient cold air. This can achieved by gradually increasing a size and/or number of said openings in the bottom wall of the inner tray when moving towards a center thereof.

In an embodiment of the device according to the invention, a first angle between the side walls and the bottom wall of the inner tray differs from a second angle be-tween the side walls and the bottom wall of the outer tray, said second angle preferably being greater than said first angle. This feature may be used to enable easier access to the stored food, e.g., for scooping fries.

In an embodiment of the device according to the invention, at least one plate-like divider element is provided for partitioning said inner tray. This enables storing of different sorts of food and prevents that the food is overmuch spread out.

In an embodiment of the device according to the invention, said inner tray has a structured upper rim for fixing said divider element. This enables easy, reliable and reproducible fixing of the divider element.

In an embodiment of the device according to the invention, the food tray, at least the inner tray, is separated or separable into a plurality of individual tray units. This makes handling and/or cleaning thereof easier.

In an embodiment of the device according to the invention, the device comprises a temperature sensor, e.g. a thermostat, for controlling the heating element and/or the fan depending on a (desired) temperature in or near said space. In this way, the food can be stored at an optimum temperature. Preferably, said temperature is adjustable by a user. Fan control may be limited to a simple ON/OFF command.

In an embodiment of the device according to the invention, said temperature sensor is located in a vicinity of the heating element within said second air flow. This provides best results.

In an embodiment of the device according to the invention, the heating element is a ribbed heating element. Applicant has found that such a design leads to best heating results with relatively low energy consumption. Furthermore, the type of heating element has superior reliability. It is very robust and able to sustain mechanical damage better than other heater types.

In an embodiment of the device according to the invention, at least the inner housing, the outer housing, the food tray and the fan chamber are of symmetrical form relative to a median vertical plane of the device. This allows for operation of the device from both sides, which is particularly well suited for scooping fries.

In an embodiment of the device according to the invention, any further electronic or electric components of the device are located outside said inner housing and/or outside said outer housing. In this way, these components are easily accessible and not subjected to any excess heat. In an embodiment, the only components that are located inside the device are (temperature) sensors, heating elements, a solid state relay (SSR), the fan, a high limit switch and a connector block. SSR and connecter block can be located on an aluminum plate that can be located partially in said first air flow, thus providing a cooling effect for the SSR.

In a particular embodiment of the device, air is sucked in through openings in the upper part of the side walls of the outer housing, then it is pressed radially into the fan chamber. A particular type of perforation selected in the side walls of the fan chamber allows for an even distribution of air over the entire length of the crumb and salting trays, i.e., the food tray. The crumb tray can have a double function: it collects food remains and also provides proper air guidance serving as part of an air channel. After leaving the fan chamber, the air is preferably forced through a ribbed heating element. All other electrical components can be installed in the cold zone, e.g., outside the (inner or outer) housing. The air sucked into the fan can have a cooling effect on the outer housing and the ability to use less powerful heating elements. Air flow to the salting tray can be achieved by a perforation in the upper part of the front and back, and further perforation of the horizontal part.

The crumb tray can be divided because of the easier handling and cleaning. Service access to components located below the crumb tray, i.e., the heating element, the fan, and electronic components, is possible from an upper side. Control of the air temperature is preferably achieved by a thermostat. All housing and channel elements can be symmetrical thus allowing operation (for example for scooping fries) from both sides.

BRIEF DESCRIPTION OF THE DRAWINGS

Further details and advantages will now be described by way of example with reference to the appended drawings.

DETAILED DESCRIPTION

Figure 1:
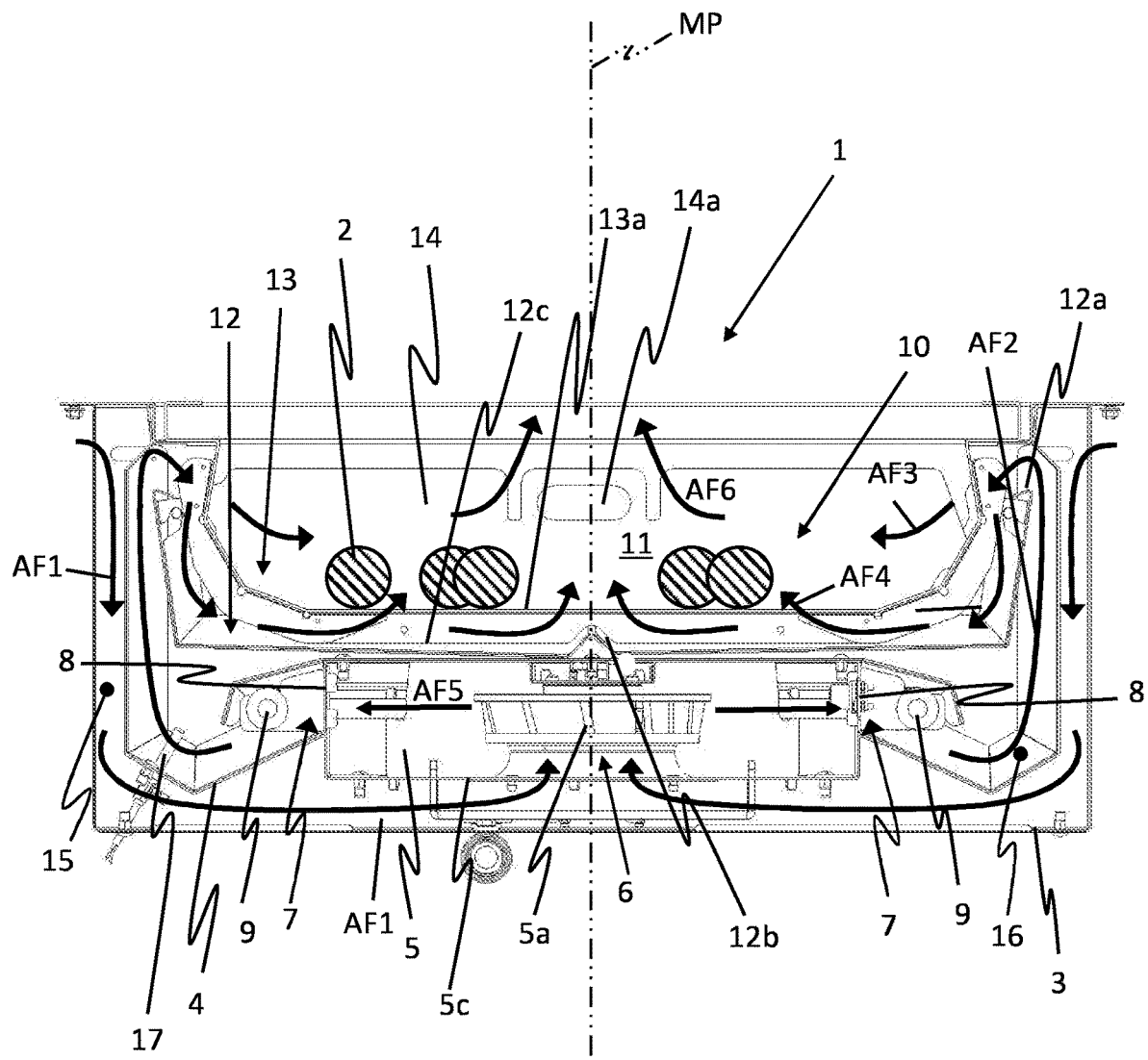
FIG. 1 shows a sectional view of the device according to the present invention.

FIG. 1 shows a sectional view of a device for a device for storing food products at hot temperature, which device is denoted in its totality by reference numeral 1. Reference numeral 2 denotes food products which are stored in the device 1. The device 1 comprises an outer housing 3 and an inner housing 4. The inner housing 4 is contained inside the outer housing 3. A fan chamber 5 is defined within the inner housing 4, the fan chamber 5 having an air inlet 6 and air outlets 7. Air inlet 6 is located in a bottom wall 5c of fan chamber 5, whereas the air outlets 7 are located in opposing side walls 8 of fan chamber 5. A fan 5a, which is devised as a centrifugal fan, is located inside fan chamber 5. In the vicinity of the fan chamber 5, i.e., on both sides thereof, there is installed a heating element 9, which heating element 9 is devised in the form of a ripped resistance heating element which heats up under the effect of an electrical current flowing there through. Heating element 9 is located, respectively, in front of said air outlets 7 of fan chamber 5.

Above fan chamber 5 device 1 comprises a food tray generally denoted by reference numeral 10. Food tray 10 defines a space 11 for holding said food products 2 inside food tray 10. Food tray 10 consists of two separate units, i.e. an outer crumb tray 12, which is essentially leak-proof and at least one inner salting tray 13 which is suspended within crumb tray 12 and which has openings in its bottom wall 13a, which openings are not visible in FIG. 1. Reference numeral 14 denotes a plate-like divider element which is used to partition salting tray 13 into several compartments. More than more divider element 14 can be used. This divider element 14 comprises a handle 14a for inserting and removing said divider element 14.

First air flow path 15 for guiding a first air flow (denoted by arrows AF1) is defined from the outside of outer housing 3 to the air inlet 6 of fan chamber 5, said first air flow path 15 extending between outer housing 3 and inner housing 4. A second air flow path 16 for guiding a second air flow AF2 is defined from the air outlets 7 of fan chamber 5 to the space 11 inside food tray 10. Heating elements 9 are located in second air flow path 16, i.e. are impinged on by second air flow AF2. This second air flow path 16 extends from outlet 7 of fan chamber 5 upwards be-tween inner housing 4 and food tray 10 (crumb tray 12) and then enters said space 11 from above after passing over a rim 12a of crumb tray 12. Having passed over said rim 12a of crumb tray 12, air flow AF2 is divided into two separate air flows, one of which (denoted AF3) directly enters space 11 while another one (denoted AF4) passes between crumb tray 12 and salting tray 13 and enters space 11 through said openings in bottom wall 13a of salting tray 13, as shown. Reference numeral 17 denotes a temperature sensor or thermostat which can be used to control fan 5a and heating elements 9 in a suitable control circuit, not shown. At reference numeral 12b crumb tray 12 has a protrusion in its bottom wall 12c which protrusion 12b serves as a deflector for deflecting air flow AF4 upwards toward space 11. Note that in the device 1 of FIG. 1, at least the inner housing 4, the outer housing 3, the food tray 10 and the fan chamber 5 are of symmetrical form relative to a median vertical plane MP of the device 1.

Arrows AF5 in FIG. 1 denote an air flow from fan 5a through fan chamber 5 outwardly in the direction of air outlets 7 and toward heating elements 9. Arrows AF6 denote an air flow leaving space 11 to the outside. While air flow AF1 is relatively cool, air flow AF2 is relatively hot due to the re-effect of heating elements 9. This has a cooling effect on outer housing 3, while air flow AF2 has a pre-heating effect on air flow AF1, thus enabling use of blow consumption heating elements 9. Air flow AF6 efficiently removes moisture from space 11, which can have a positive effect on tastes and/or quality of food products 2.

Food tray 10 has a length and a width, only the latter of which is visible in FIG. 1. Together, said length and said width define an essentially rectangular opening for accessing space 11 from above.

As can be further gather from FIG. 1, an angle between side walls (not denoted) and the bottom wall of salting tray 13 differs from an angle between the side walls (not denoted) and bottom wall 12c of the salting tray 12, wherein the latter angle is greater than said other angle. In the context of the present invention, the salting tray 12 can also be referred to as outer tray, whereas the crumb tray 13 can also be referred to as inner tray.

Figure 2:
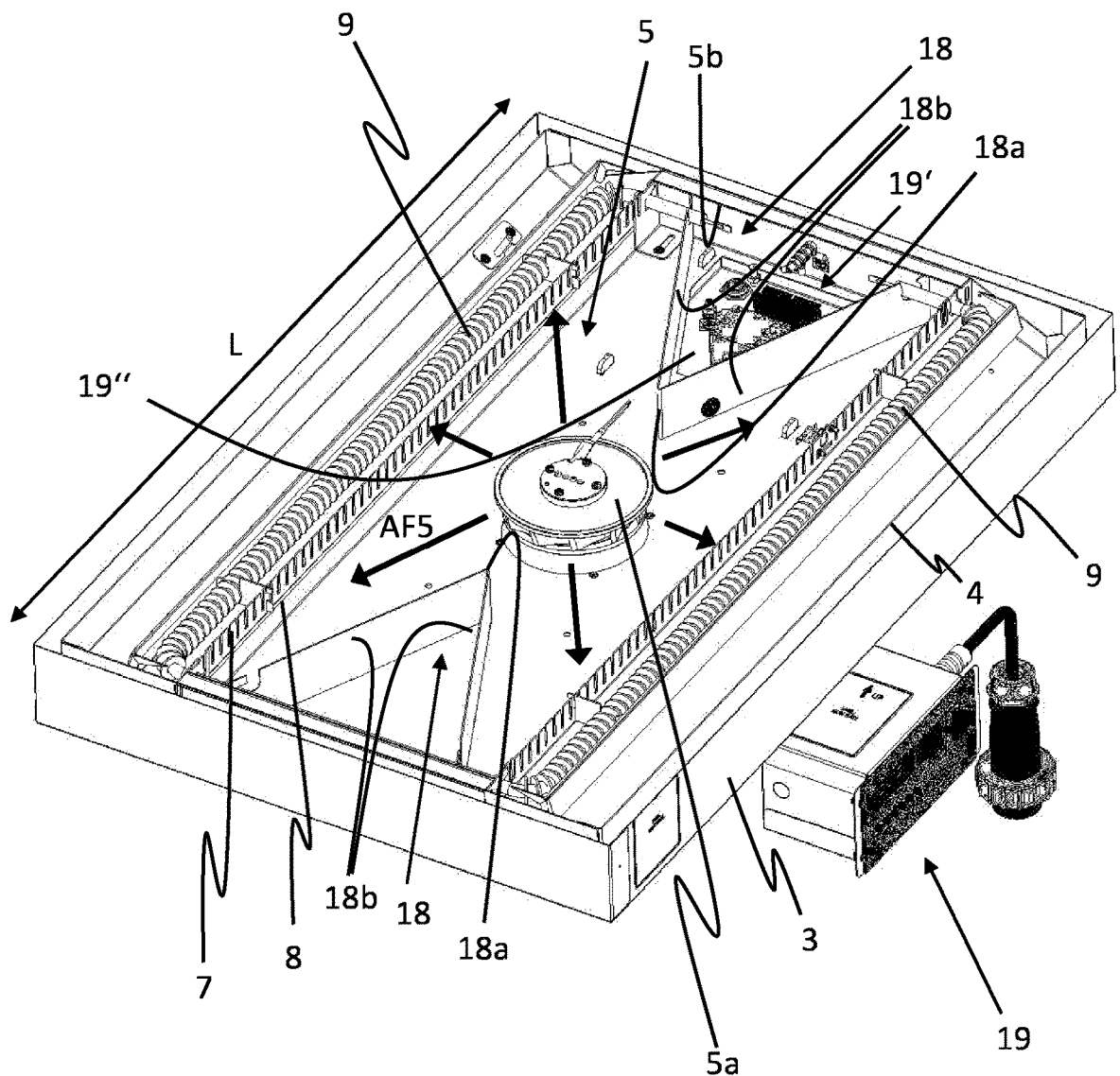
FIG. 2 shows a prospective view of the bottom part of the device in FIG. 1, a particular a fan chamber thereof.

Referring now to FIG. 2, said figure shows the bottom part of the device 1 in FIG. 1, i.e., the bottom part of outer housing 3, inner housing 4 and fan chamber 5. In all appended drawings, the same reference numerals are used to define respective features of device 1.

As can be seen from FIG. 2, fan chamber 5 extends over an entire length L of the device, which length L corresponds to said length mentioned above in connection with FIG. 1. Fan chamber 5 is overall rectangular shape, and the air outlets 7 in side wall 8 mentioned earlier are devised in the form of a plurality of openings or slots which essentially extend over the entire length L. Heating elements 9 are de-vised in elongated form and also extend essentially over the entire length L of fan chamber 5. In this way, air flow AF2 can be heated continuously and can be used to heat space 11 (cf. FIG. 1) in homogenous fashion over the entire length. Fan 5a is located essentially in the center of fan chamber 5. Fan chamber 5 further com-prises two identical deflecting elements 18 which have an overall triangular form with an apex 18a situated in proximity to fan 5a. From said apex 18a two deflectors 18b extend toward a respective shorter side wall 5b of fan chamber 5 and in a direction toward opposite longer side walls 8 of fan chamber 5. Said longer side walls 8 of fan chamber 5 are identical with the side walls mentioned earlier in connection with air outlet 7. As would be noted by a person skilled in the art, the deflecting elements 18 are by no means limited to the special configuration shown in FIG. 2 as long as they are effective in deflecting air flow AF5 generated by fan 5a toward side walls 8 of fan chamber 5 so that the air flow may then pass through the air outlets 7 and homogenously impinge on heating elements 9, as shown in FIG. 2.

Reference numeral 19' in FIG. 2 denotes electronic equipment, e.g., a solid state relay (SSR), a high limit switch and a connector block. The SSR and connector block are preferably located on an aluminum plate 19" that can be located partially in said first air flow, thus providing a cooling effect for the SSR.

Figure 3:
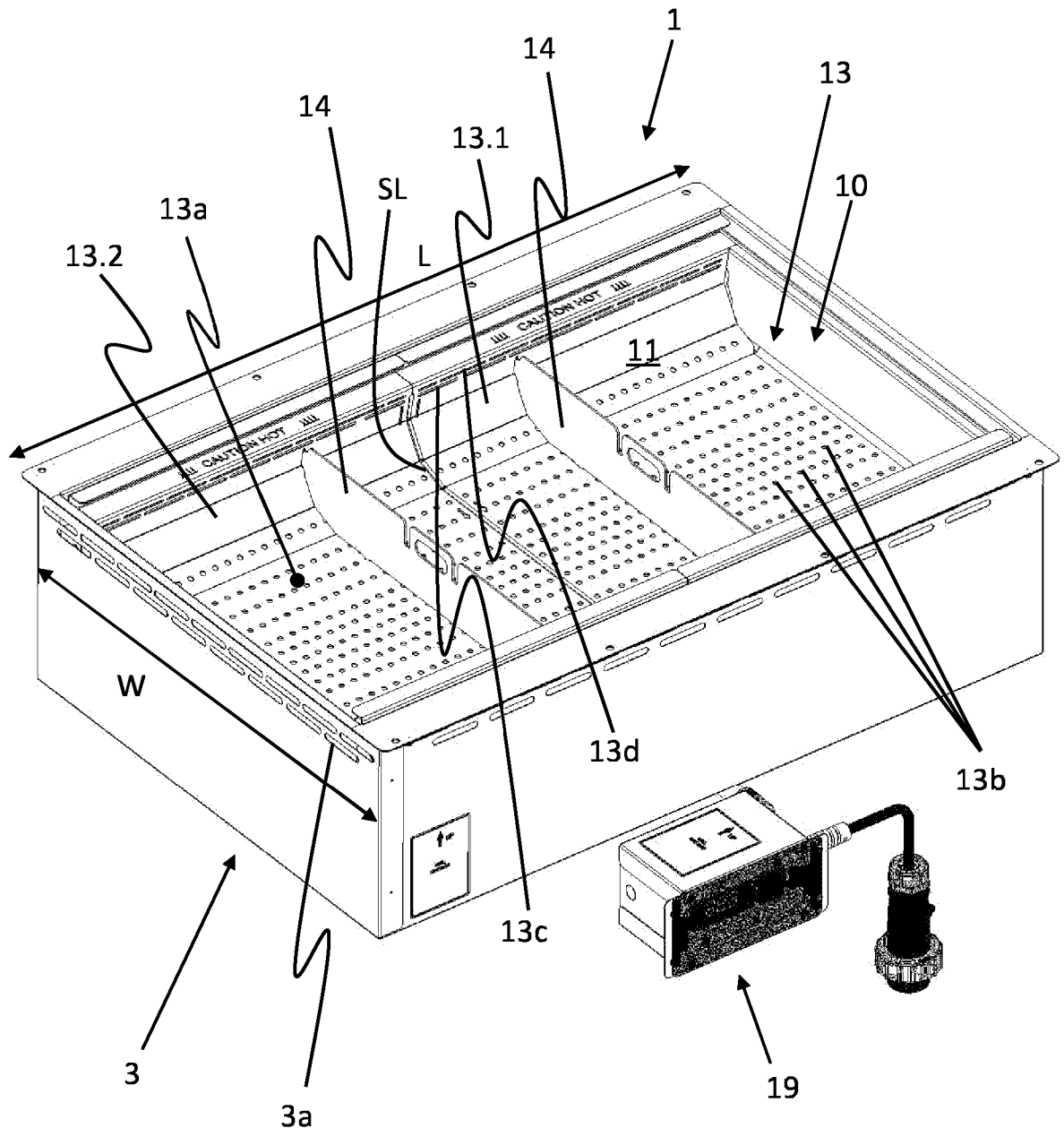
FIG. 3 shows a prospective overall view of the device in FIG. 1.

FIG. 3 shows an overall prospective view of device 1. In FIG. 3 both, width W and length L of food tray 10 are visible. Further visible are previously mentioned openings 13b in bottom wall 13a of salting tray (inner tray) 13, which openings are de-vised for letting pass air flow AF4 (cf. FIG. 1) there through. The openings 13b are distributed essentially evenly or homogenously throughout food tray 10.

As can be further gathered from FIG. 3, food tray 10, i.e., at least inner tray 13 is subdivided into two individual tray units 13.1, 13.2 as can be seen from separation line SL.

Inner tray 13 may have a structured upper rim (not shown) for fixing the divider elements 14. For example, said structure upper rim 13c could have a saw tooth pattern.

The salting tray (inner tray) 13 has openings 13c, 13d along its upper edge, as shown, which are arranged in parallel series for letting pass air flow AF3 (FIG. 1).

Lower openings 13c have a bigger dimension (opening surface) than upper openings 13d. Owing to this particular feature, applicant has achieved separation of (cold) ambient air above food tray 10 and (hot) air from air flow AF3. In fact, the ambient air effectively stays on top of the hot air inside food tray 10 without mixing. In the center of the device 1, i.e., in the vicinity of line MP in FIG. 1, air flow AF6 rises, thus lifting the cold air layer above food tray 10. Said openings 13c, 13d do overlap between the two series, meaning that an opening from a first series formed by the lower openings 13c is located where there is a gap between two adjacent openings from a second series formed by the upper openings 13d, and vice versa.

As can also be gathered from FIG. 3, outer housing 3 has a plurality of openings 3a in longer side walls thereof, which openings 3a are arranged over essentially the entire length of device 1 (i.e., food tray 10 or space 11). It is through these openings 3a that said first air flow (AF1, cf. FIG. 1) enters the device 1.

Finally, as can be gathered from FIG. 3, further electronic or electric components 19 of the device 1, i.e., a control unit, a user interface or the like, are located out-side inner housing 4 (cf. FIG. 1) and/or outside outer housing 3.

The invention claimed is:

1. A device (1) for storing food products (2) at a hot temperature, comprising:
    an outer housing (3);
    an inner housing (4), said inner housing (4) is at least partially contained inside said outer housing (3);
    a fan chamber (5) defined within said inner housing (4), said fan chamber (5) having at least one air inlet (6) and one air outlet (7);
    a fan (5a) located inside said fan chamber (5);
    at least one heating element (9) installed in a vicinity of said fan chamber (5); and at least one food tray (10) defining a space (11) that is configured to hold the food products (2) inside said food tray (10); wherein
    a first air flow path (15) for guiding a first air flow (AF1) is defined via openings (3a) in the outer housing (3) for a non-recirculating air flow from an outside of said outer housing (3) to the air inlet (6) of said fan chamber (5), said first flow path (15) extending between said outer housing (3) and said inner housing (4);
    a second air flow path (16) for guiding a second air flow (AF2) is defined from the air outlet (7) of said fan chamber (5) to said space (11) inside said at least one food tray (10), the second air flow path (16) extending between said inner housing (4) and a leak-proof outer tray of the at least one food tray (10) to enter the space (11) from above;
    wherein the first air flow path (15) is parallel to and separated from the second air flow path (16) by the inner housing (4); and
    the at least one heating element (9) is located in said second air flow path (16).

2. The device (1) according to claim 1, wherein the food tray (10) has a length (L) and a width (W), said length (L) and said width (W) define a rectangular opening for accessing said space (11).

3. The device (1) according to claim 2, wherein said heating element (9) has a length which corresponds to the length (L) of the food tray (10), said heating element (9) being arranged parallel to a length direction of said food tray (10).

4. The device (1) according to claim 1, wherein at least one of the fan (5a) or the fan chamber (5) is adapted to convey a majority of an air flow (AF5) generated by the fan (5a) toward the heating element (9).

5. The device (1) according to claim 4, wherein the fan chamber (5) comprises at least one deflecting element (18) for conveying at least part of the air flow (AF5) generated by the fan (5a) toward the heating element (9).

6. The device (1) according to claim 5, wherein said fan chamber (5) is rectangular in shape with corresponding side walls (8); and the deflecting element (18) has a shape and is located relative to said fan (5a) so as to deflect the air flow (AF5) generated by the fan (5a) toward said air outlet (7) of the fan chamber (5), and said air outlet (7) is located in a side wall (8) of said fan chamber (5).

7. The device (1) according to claim 6, wherein the air outlet (7) is located at a longer one of the side walls (8) of said fan chamber (5), and is formed of a plurality of air outlet openings extending over a majority of said longer side wall (8).

8. The device (1) according to claim 7, wherein the fan (5a) is located centered in said fan chamber (5).

9. The device (1) according to claim 6, wherein there are two of the deflecting elements (18), each one of said deflecting elements (18) having an apex (18a) situated in proximity to said fan and at least two deflectors (18b) extending from said apex (18a) toward a respective shorter side wall (5b) of said fan chamber (5) in a direction toward opposite longer ones of the side walls (8) of said fan chamber (5).

10. The device (1) according to claim 1, wherein the outer housing (3) and the inner housing (4) have parallel side walls (8) and parallel bottom walls (13a); and the air inlet (6) of said fan chamber (5) is located at a bottom wall (5c) of the fan chamber (5) and below an entry point for ambient air into the outer housing (3).

11. The device (1) according to claim 1, wherein an entry point for air into said food tray (10) is located above the air outlet (7) of said fan chamber (5).

12. The device (1) according to claim 1, wherein respective first and second air flow directions (AF1, AF2) in the respective first and second air flow paths (15, 16) are antiparallel.

13. The device (1) according to claim 1, wherein the fan chamber (5) is located below said food tray (10), the first air flow (AF1) enters from outside of said outer housing (3) via openings (3a) through sides of the outer housing located along a width and length thereof, and flows between the outer housing and the inner housing to the air inlet of the fan chamber which faces a bottom of the outer housing.

14. The device (1) according to claim 1, wherein the food tray (10) comprises the leak-proof outer tray (12) and an inner tray (13), said inner tray (13) being suspended or suspendable within said outer tray (12) and having a number of openings (13b) at least in a bottom wall (13a) thereof.

15. The device (1) according to claim 14, further comprising a third air flow path for guiding a third air flow (AF4) is defined between at least one of a side wall or a bottom wall (13a) of said inner tray (13) and at least one of a side wall or a bottom wall (12c) of said outer tray (12), said third air flow (AF4) is a continuation in part of said second air flow (AF2), and said third air flow (AF4) flows in an opposite direction to said second air flow (AF2) on opposite sides of the side wall of the outer tray (12).

16. The device (1) according to claim 15, wherein the outer tray (12) comprises, at the bottom wall (12c) thereof a deflecting element (12b) for forcing said third air flow (AF4) upwards through said openings (13b).

17. The device (1) according to claim 16, wherein a first angle between the side walls and the bottom wall (13a) of the inner tray (13) differs from a second angle between the side walls and the bottom wall (12c) of the outer tray (12), said second angle being greater than said first angle.

18. The device (1) according to claim 17, wherein at least one plate-shaped divider element (14) is provided for partitioning said inner tray (13).

19. The device (1) according to claim 18, wherein at least the inner tray (13) is separated or separable into a plurality of individual tray units (13.1, 13.2).

20. The device (1) according to claim 19, wherein said second air flow path (16) opens to an environment of the device (1).

21. The device (1) according to claim 1, wherein the food tray (10) has series of openings (13c, 13d) along an upper edge thereof that are adapted to let one of the air flows (AF2, AF3) pass into said space (11), a first series of said openings (13c) being arranged below a second series of said openings (13d), and said openings (13c) in said first series of openings have a bigger dimension or opening surface than said openings (13d) in said second series of openings.

22. The device (1) according to claim 1, further comprising a temperature sensor (17) configured to control at least one of the heating element (9) or the fan (5a) depending on a temperature in or near said space (11).

23. The device (1) according to claim 22, wherein said temperature sensor (17) is located in a vicinity of the heating element within the second air flow.

24. The device (1) according to claim 1, wherein the heating element (9) is a ribbed heating element (9).

25. The device (1) according to claim 1, wherein at least the inner housing (4), the outer housing (3), the food tray (10) and the fan chamber (5) are of symmetrical form relative to a median vertical plane (MP) of the device (1).

26. The device (1) according to claim 1, further comprising electronic or electric components (19) located outside at least one of said inner housing (4) or outside said outer housing (3).

27. A device (1) for storing food products (2) at a hot temperature, comprising:
an outer housing (3);
an inner housing (4), said inner housing (4) is at least partially contained inside said outer housing (3);
a fan chamber (5) defined within said inner housing (4), said fan chamber (5) having at least one air inlet (6) and one air outlet (7);
a fan (5a) located inside said fan chamber (5);
at least one heating element (9) installed in a vicinity of said fan chamber (5); and at least one food tray (10) defining a space (11) that is configured to hold the food products (2) inside said food tray (10); wherein
a first air flow path (15) for guiding a first air flow (AF1) is defined via openings (3a) in the outer housing (3) for a non-recirculating air flow from an outside of said outer housing (3) to the air inlet (6) of said fan chamber (5), said first flow path (15) extending between said outer housing (3) and said inner housing (4); and
a second air flow path (16) for guiding a second air flow (AF2) is defined from the air outlet (7) of said fan chamber (5) to said space (11) inside said at least one food tray (10);
the at least one heating element (9) is located in said second air flow path (16);
the at least one food tray (10) comprises a leak-proof outer tray (12) and an inner tray (13), said inner tray (13) being suspended within said outer tray (12) and having a number of openings (13b) at least in a bottom wall (13a) thereof;
the second air flow path extends between said inner housing and the leak-proof outer tray (12) of the at least one food tray (10) to enter the space (11) from above; and
a third air flow path for guiding a third air flow (AF4) is defined between at least one of a side wall or a bottom wall (13a) of said inner tray (13) and at least one of a side wall or a bottom wall (12c) of said outer tray (12), said third air flow (AF4) is a continuation in part of said second air flow (AF2), and said third air flow (AF4) flows in an opposite direction to said second air flow (AF2) on opposite sides of the side wall of the outer tray (12).

* * * * *